United States Patent
Ames

(10) Patent No.: US 7,059,059 B1
(45) Date of Patent: Jun. 13, 2006

(54) COMBINATION LEVEL, PLUMB TOOL WITH SINGLE-HAND ENGAGEMENT

(76) Inventor: Kenneth D. Ames, 701 Los Huecos Dr., San Jose, CA (US) 95101

( * ) Notice: Subject to any disclaimer, the term of this patent is extended or adjusted under 35 U.S.C. 154(b) by 0 days.

(21) Appl. No.: 10/420,166

(22) Filed: Apr. 21, 2003

Related U.S. Application Data

(60) Provisional application No. 60/374,375, filed on Apr. 22, 2002.

(51) Int. Cl.
*G01C 9/00* (2006.01)

(52) U.S. Cl. .......................................................... 33/372

(58) Field of Classification Search .................. 33/370, 33/371, 372, 373, 412, 529, 379
See application file for complete search history.

(56) References Cited

U.S. PATENT DOCUMENTS

| | | | | |
|---|---|---|---|---|
| 1,200,410 A | * | 10/1916 | Chemrinsky | 33/370 |
| 1,341,553 A | * | 5/1920 | Hahne | 33/372 |
| 3,230,632 A | * | 1/1966 | Redding | 33/372 |
| 4,168,578 A | * | 9/1979 | VanderWerf | 33/371 |
| 5,450,677 A | * | 9/1995 | Casey | 33/529 |
| 5,581,900 A | * | 12/1996 | Payne | 33/370 |

* cited by examiner

*Primary Examiner*—Christopher W. Fulton
(74) *Attorney, Agent, or Firm*—George M. Steres

(57) ABSTRACT

A combination plumb and level tool has an elongate body with separated longitudinal arm members that have spaced apart, proximal ends fixed to the body and extend therefrom to respective separate distal free ends. The distal ends form longitudinally extending interior surfaces disposed in facing opposition located between their respective fixed and free ends. The arms and the body between them have a generally U-shaped cross section that forms an open trough from the free ends to a base contact surface between the proximal fixed ends. At least one of the arms has longitudinal extending first contact surface portion disposed on its interior surface. The first contact surface portion faces an opposing second contact surface portion of the facing arm interior surface. An elastic member cooperating with the first arm and the body biases the first arm inward, toward the second contact surface portion on the other of the arms. The arms are separated so the contact surface portions are spaced less than the width of a work piece received therein that is to be leveled or plumbed. The two arm contact surfaces and the base contact surface are disposed so that a rectangular object having an edge face between opposite parallel sides and a width between the parallel sides greater than the initial spacing can be received within the open trough with its edge face in contact with the base contact surface and the opposite sides in contact with the opposed facing contact surfaces of the two projecting arms. The tool is applied to an elongate work having opposite sides connected by an edge face, by aligning the trough and work longitudinally with the free end of the biased arm in contact with one side of the work and the free end of the other arm in contact with the edge face. The level is pressed toward the work, simultaneously forcing the work into the trough by using the work as a wedge that forces the two arms to spread apart until the opposing interior arm surfaces proximally engage opposite sides of the work. The level and the work are then moved together until the adjacent side of the work in the trough contacts the base contact surface of the body along its length. This leaves the body and the work aligned in two orthogonal axes defined by the arm's contact surfaces and the body's interior contact surface.

10 Claims, 12 Drawing Sheets

SECTION A-A

COMBINATION LEVEL, PLUMB TOOL WITH SINGLE-HAND ENGAGEMENT

This Application claims the benefit of earlier filed Provisional Patent Application 60/374,375, filed Apr. 22, 2002.

BACKGROUND

Typical homeowners are not in the construction trade; however many are familiar with building simple structures around the house, e.g., additional structures for storage in the garage, a shed, a patio cover and the like. During construction of these projects, it is often necessary to use a standard bubble level to check horizontal or vertical members of the framework being assembled. In many cases, the builder needs to orient and hold the level against the work piece with one hand in order to align the work piece in place with the other. This leaves one in the awkward condition of having both hands involved holding the work piece aligned while holding the level oriented on the work piece.

In order to permanently fix the work piece in place at the aligned location, one must put continue to hold the level and work piece aligned with one hand, pick up a tool or tools (e.g., a hammer and a nail) and try to use the tool(s) to attach the work piece without disturbing the alignments of the level and the work piece.

It may also be necessary to move the work piece and re-align it several times. This is a common situation, and can lead to frustrating and time wasting experiences.

Existing plumb tools require the use of both of the users hands, in many cases this may be undesirable. In construction of structures large and small, professional or home repair, the user may want or need the other hand to hold the object to be plumb or level. Example: a user is building a structure that uses 2×4 common lumber, with one hand that user holds the object (2×4) with the other cannot attach or engage the plumb tool that requires both hands.

There are attachable levels that are available in the trades. One known type requires the user stretch a rubber band strap around the object to be leveled by using two hands. This method has several disadvantages, specifically because when an object or structural member is being attached to a structure or frame, that is the same time the user needs both hands free for alignment or other tasks. Another disadvantage is the requirement that the elastic strap completely surround the member, making it impossible to align two contiguous, coplanar members because of the strap between them.

U.S. Pat. No. 392,124 by Jackson describes a spirit level mounted in a casting with three screw holes for securing the level to a leveling rod or pole. A series of three wood screws are used for semi-permanently mounting the level to the vertical leveling rod or pole and is clearly not attachable or removable with one hand.

The Geier U.S. Pat. No. 2,356,311 describes an orbital bubble level of the general type that is employed in other previously mentioned inventions.

Dodson, in U.S. Pat. No. 2,541,641 describes an adjustable bubble level that is mainly for use in checking rotatable machine elements, such as shafts, pulleys, flywheels, fan rotors, gears, and the like a base member in the form of an inverted V-block is adapted to straddle and fit over the rotatable machine element such as a shaft. The V-block has a vertical post for supporting a vial yoke that in turn carries the level vial. This level is for determining a horizontal position, rather than in finding a plumb line. The V-Block is held to the shaft by means of a flexible chain that is attached at one end to the block, and at the other end is provided with an adjustable wing nut for engagement with adjacent end of the V-block. Attachment of the Dodson level to the shaft requires the use of at least two hands, one for holding the level and chain in position, and the other for turning the wing nut.

The Zipser U.S. Pat. No. 2,757,458 describes a bubble level for attachment to a portable drill, where the level may be angularly adjusted with respect to the drill so that the drill is capable of drilling holes at predetermined angles without requiring the use of a drill press.

The Weichert U.S. Pat. No. 2,806,296 is another patent showing a bubble level for attachment to a portable electric drill, which enables the drill operator to guide the drill at any angle with respect to the horizontal.

The Baher U.S. Pat. No. 3,826,013 describes a multi-purpose tool that may be use to level, square, and plumb various cylindrical, curved, inclined, and planar shaped objects. This Baher tool has a body member with right angular arms for forming a vertical elongated groove that is adapted to butt against and accommodate an elongate object, such as a post, rod, pipe, or conduit. There is also a horizontal shell for supporting a bubble level or a target type "bulls-eye" liquid vial for use in leveling or plumbing an object being measured or positioned. A handle is disposed beneath the horizontal shelf for grasping by the user. This patent does not illustrate a means for attaching the tool to the object being measured so as to free up both hands of the user.

U.S. Pat. No. 4,343,093 by Eadens discloses a leveling instrument having a level mounted on a ledge supported by a body member. The body member has a pair of right-angular arms to engage an object to be plumbed, a bead chain attached at one end to the body member, where said chain has a length extending to a free end along its length adapted to snugly encircle the object so engaged. A keeper is fixed to the body with quick-attachment and quick-release capability to engage the encircling bead chain length at its free end.

Eadens' encircling chain and keeper method for attaching the leveling instrument to such an engaged object requires the user to hold the plumb tool body with one hand, and to engage the arms in abutting relationship against co-extensive right-angular surfaces on the object to be plumbed. At the same time, the other hand is occupied to snugly encircle a length of the chain around the object, reaching from its fixed end on the body to a free end length at the mounted keeper. While still maintaining the body member arms in said abutting engagement with the one hand, the other hand remains occupied in order to attach the free end length of the snugly fitting bead chain to the keeper with the quick-attachment means thereat. This leaves the leveling instrument in self-supporting abutment with the engaged object. Although this permits the leveling instrument to remain in self-supporting attachment for verifying level or plumb with the object while it is independently maneuvered with one or both hands, it does not solve the problem of requiring both hands to first attach the instrument to the object, prohibiting a simple, single handed method of attaching the instrument to the object independent of holding the instrument in engaged relationship with the object.

U.S. Pat. No. 4,571,845 by Wright describes methods for retaining the bubble level vials, specifically a snap-fit method refers to a recess having a semi-cylindrical contour and a via U-receiving opening defined between a pair of opposed ridges. This vial mounting structure can be employed as part of a number of level and plumb tools but does not provide a means for one-hand attachment to a general construction object, but rather to the body of a level or plumb indicating device.

The Eadens U.S. Pat. No. 4,343,093 describes a plumb tool that is adapted to be mounted to the object that is being plumbed. This tool has a body member formed of rigid material with a pair of right angular arm portions, where each arm has a substantially flat inner surface for use in engaging an object that is to be plumbed. An orbital bubble level is mounted on a ledge that projects outwardly from one arm portion to indicate when the object is plumb in all directions from a vertical axis. A flexible elongated strap member is attached at one end to the body member and is adapted to engage the object that is to be plumbed.

A keeper is mounted on the other end of the tool for engaging the other end of the strap member so the tool has quick-attachment and quick-release capability. This patent does not illustrate a means for attaching the tool that only requires one hand to attach by the user. It is obvious that one hand must support the body of the level against the object, while the other hand attaches the other end of the strap to the keeper.

Payne, in U.S. Pat. No. 5,819,425 discloses a clamp (FIGS. 1–6) for temporarily attaching a level to a construction component including an elongated metal or plastic, inverted U-shaped, two-piece body with an opening in the center of the top wall that extends partway down the side walls through which the level bubble is seen, a pair of pivotally-mounted, spring-loaded, opposed jaws (FIGS. 7–15) for temporarily gripping the construction component, and grooves, a micro catch patches, or screws for temporarily attaching the level to the body. The two-piece body allows for adjustment to levels of different widths. A plurality of pins 214 extend approximately perpendicularly from the inner surface 216 adjacent to the lower edge 218 of the jaws lower portion 204. Preferably there are two pins 214, one near each end of the jaw 14, 16. The pins 214 allow the jaws 14, 16 to securely grip the construction element to which the level is being clamped.

Payne's clamp has several features that can be disadvantages in many circumstances. There is inherent possibility of possible misalignment between the clamp, the level and the component, if the clamp and level are not correctly mounted or when edges and surfaces relied on for alignment become worn or damaged or have foreign material agglomerated between then, e.g., paint, dirt and the like. Also there is additional cost added for a user who must purchase the clamp/jaw assembly in addition to the original cost of the level. It would be desirable to have level with such a spring like clamp capability to attach a level to a construction component without the added cost or possible alignment degradation presented in Payne.

Also, the pins can mar the surface of a construction member, which may be unacceptable in certain cases.

Walters, et al. in U.S. Pat. No. 5,933,974 describes a carpenter's square having a first and second leg at right angles to each other, and a third leg extending between the first and second legs. A magnetic strip is provided on the first leg for attaching the tool to a metallic surface to be plumbed. A first notch in the third leg a first distance from the first leg and a second notch in the third leg a second distance from the first leg so that a plumb string can be threaded through the first and second notches and thereby held in place to support a plumb bob to allow a plumb reading to be taken without the need for manually supporting the plumb bob. Walters' square is limited to attachment to metallic objects thus being useless in the ordinary wood construction trade. Walter's magnetic strip only aligns the square along one axis on the plane of a flat surface, requiring the user to make another adjustment to get the level aligned on two axes and thus would not be useful for non-planar construction members, e.g., pipes.

It would be useful if was easy to temporarily attach a level to the work piece while holding a tool in the other hand, simultaneously aligning and holding the level and the work piece in place with one hand. One would not have to put down and pick up other tools, in order to handle the level. A level that can be temporarily attached to the work piece for orienting and aligning the work piece, with one hand, would offer the advantage of keeping the other hand free for another task, e.g., holding another work piece or handling other tools.

It would also be an advantage for the level to be aligned in two orthogonal axes when attached with one simple operation.

SUMMARY

The combination plumb and level tool 100 has an elongate body with two separated arm members that have spaced apart, parallel, longitudinal ends fixed to the body and extend therefrom to respective separate free ends. The arm members form opposite facing interior surfaces between their respective fixed and free ends. The two arms and the body between them have a generally U-shaped cross section that forms an open trough from the free ends to a base contact surface on the body between the fixed ends. At least one of the arms has first contact surface portion disposed on its inner surface. The first contact surface portion faces an opposing second contact surface portion of the facing arm surface. An elastic member cooperating with the first arm and the body biases the first arm inward, toward a second contact surface portion on a portion of the other of the arms. An initial spacing between the two contact surface portions is made less than the width of a work piece that is to be leveled or plumbed. The two arm contact surfaces and the base contact surface are disposed so that a rectangular object having an edge face between opposite parallel sides and a width between the parallel sides greater than the initial spacing can be received within the open trough with its edge face in contact with the base contact surface and the opposite sides in contact with the opposed facing contact surfaces of the two projecting arms. The tool is applied to an elongate work having opposite sides connected by an edge face, by aligning the trough and work longitudinally with the free end of the biased arm in contact with one side of the work and the free end of the other arm in contact with the edge face. The level is pressed toward the work, simultaneously forcing the work into the trough by using the work as a wedge that forces the two arms to spread apart until the opposing interior arm surfaces proximally engage opposite sides of the work. The level and the work are then moved together until the adjacent side of the work in the trough contacts the base contact surface of the body along its length. This leaves the body and the work aligned in two orthogonal axes defined by the arm's contact surfaces and the body's interior contact surface.

ADVANTAGES

The primary advantage of the present EZ-level invention is that the user can temporarily attach the EZ-level to the member to be leveled whether wood or metal, by a simple one handed mechanical operation, having it aligned automatically in two axes, leaving it supported only by the attachment to the work piece, thereby leaving both hands free for other tasks.

Another advantage of certain embodiments of the EZ-level invention is that it can be attached and oriented to the work piece by a simple motion with one hand. If a homeowner, framer, construction worker, is in the process of constructing a house, shed, wall, or any structure that is desired to be plumb or level, and would like to keep both hands free for holding the work piece in order to swing a hammer, or use any type of tool, Another advantage of the EZ-level invention is the hands-free retention attachment feature that serves to clamp the level to the work piece during this process.

This advantage is not trivial, as it leaves the user with both hands free, after attaching the level to the work piece, for observing the level indicators to position the work piece with one hand to be level or plumb, and then fixing it in place by hammer and nail or other means.

This tool also allows the user to level the work piece and leave it temporarily in place, and to check and maintain level before, during after the piece is fixedly attached.

Embodiments of the present invention have clamping means with spaced apart longitudinal contact surfaces disposed in facing opposition for applying retention friction forces when in contact with opposing sides of the construction member. The contact surfaces may be smooth to minimize marring their surfaces or may be textured or provided with rough or pointed surfaces to enhance frictional retention.

Yet another advantage of embodiments of the EZ-level invention is the attachment can be done from one side of the work piece, leaving at least one plane of the work piece free from obstruction.

BRIEF DESCRIPTION OF THE DRAWINGS[1]

[1] Additions to drawings 13 Apr. 03.

DETAILED DESCRIPTION

FIG. 1 Description

Figure 1:
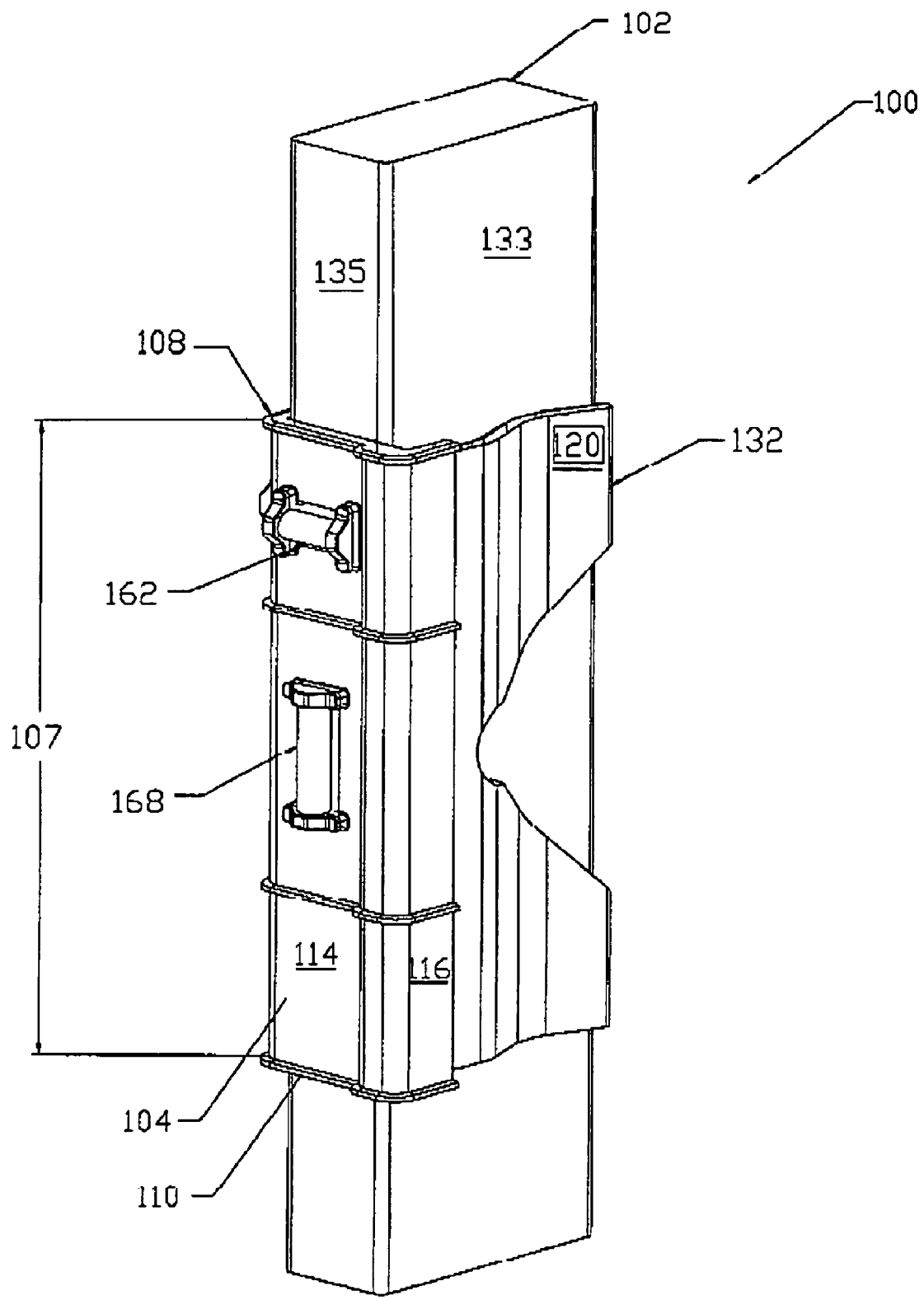
FIG. 1 shows a perspective view of an embodiment of the present EZ-level invention attached to a common 2 by 4.
Figure 1A:
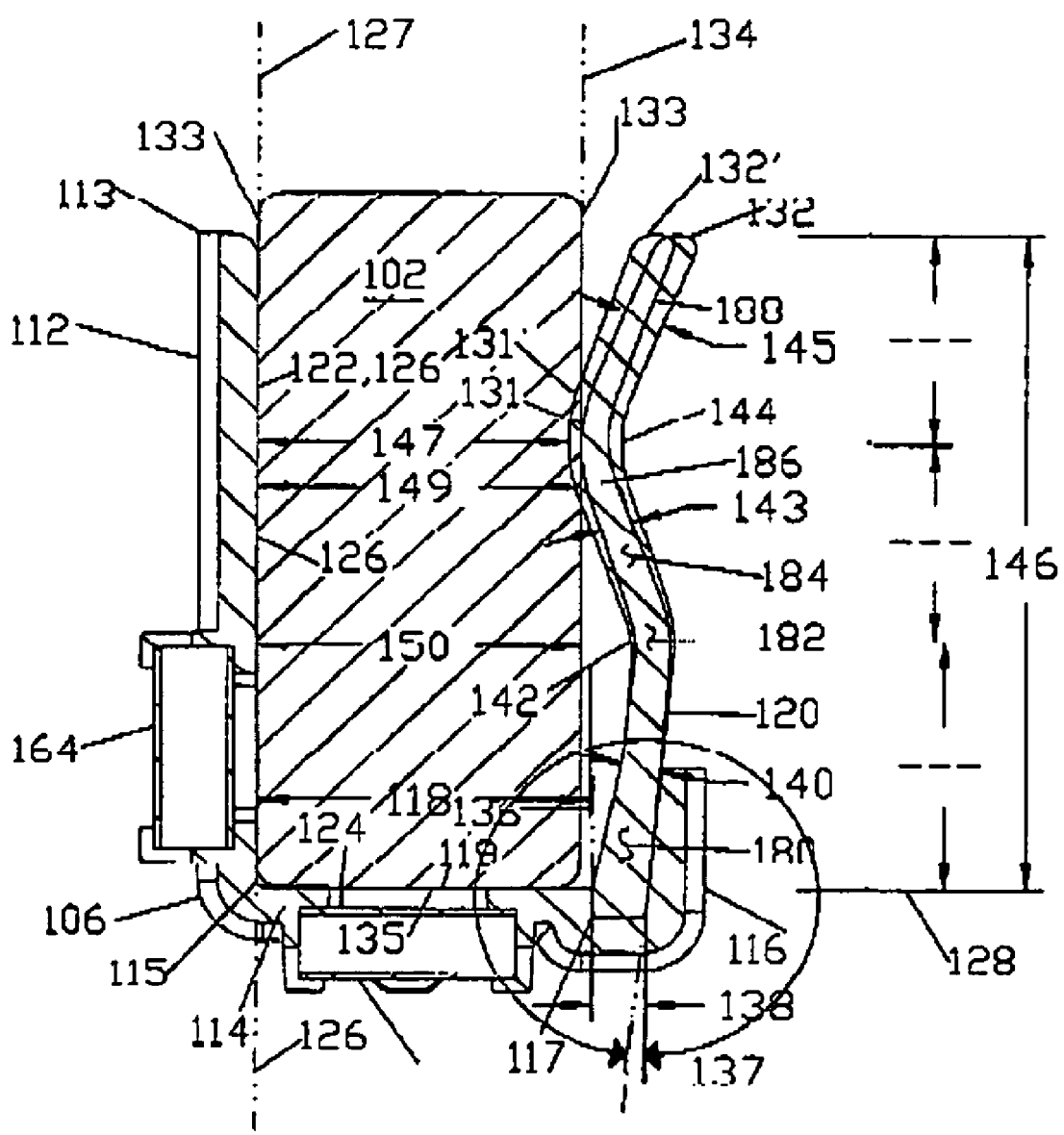
FIG. 1A Illustrates a cross-section end view of the EZ-level of FIG. 1 taken along the plane indicated by arrows A—A in FIG. 1C
Figure 1B:
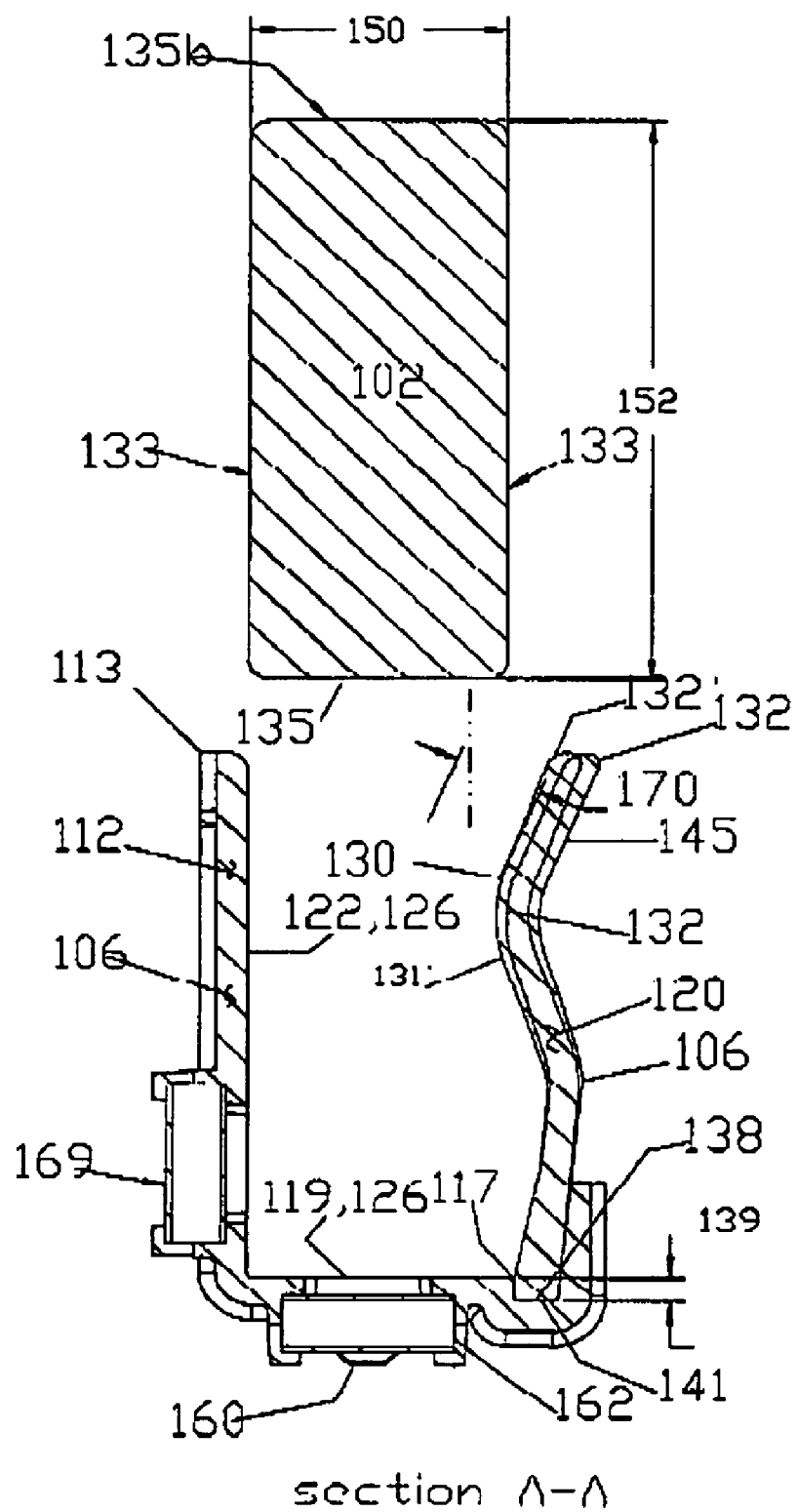
FIG. 1B is an exploded view of the EZ-level and 2×4 of FIG. 1A aligned for insertion.
Figure 1C:
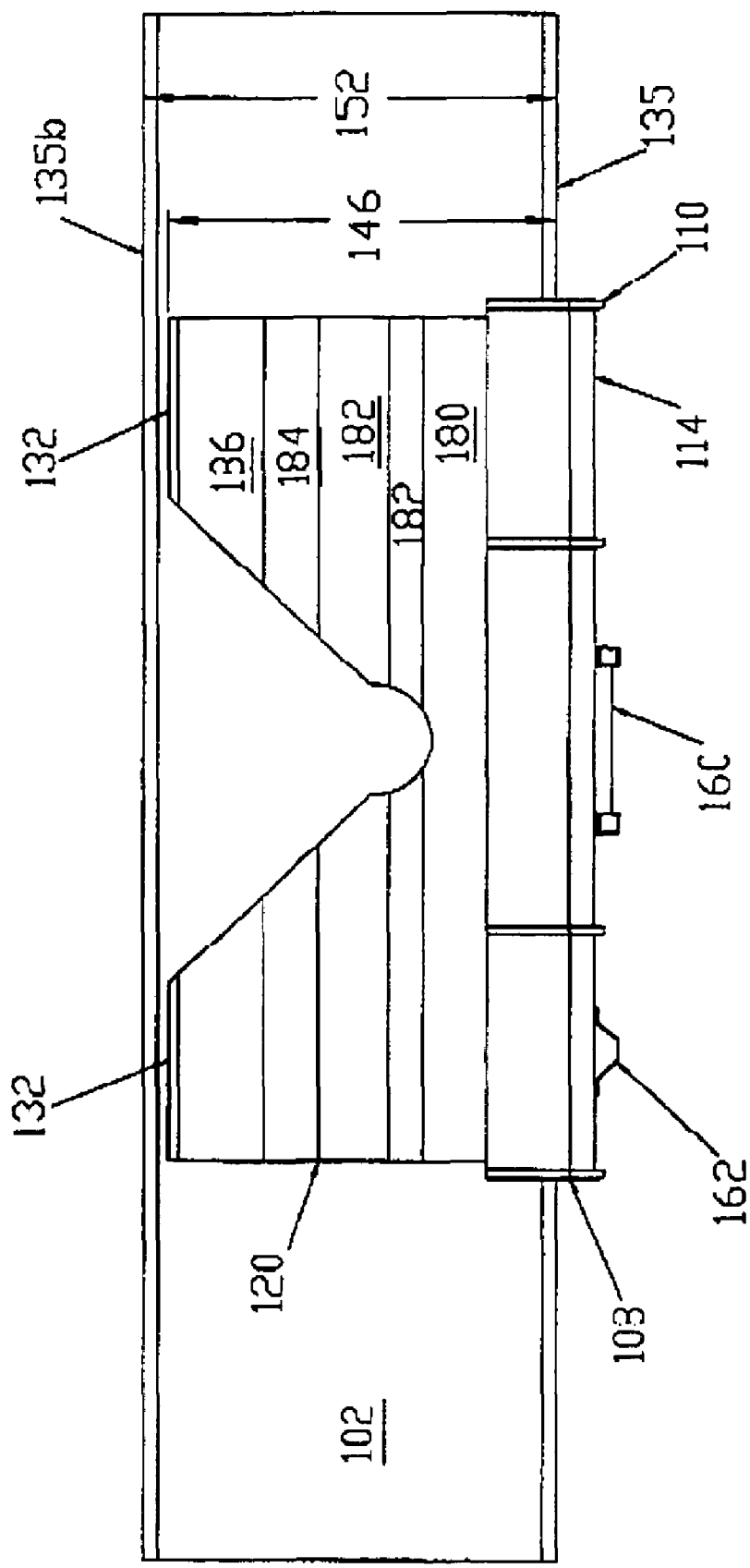
FIG. 1C is a side elevation view of the EZ-level of FIG. 1.
Figure 2:
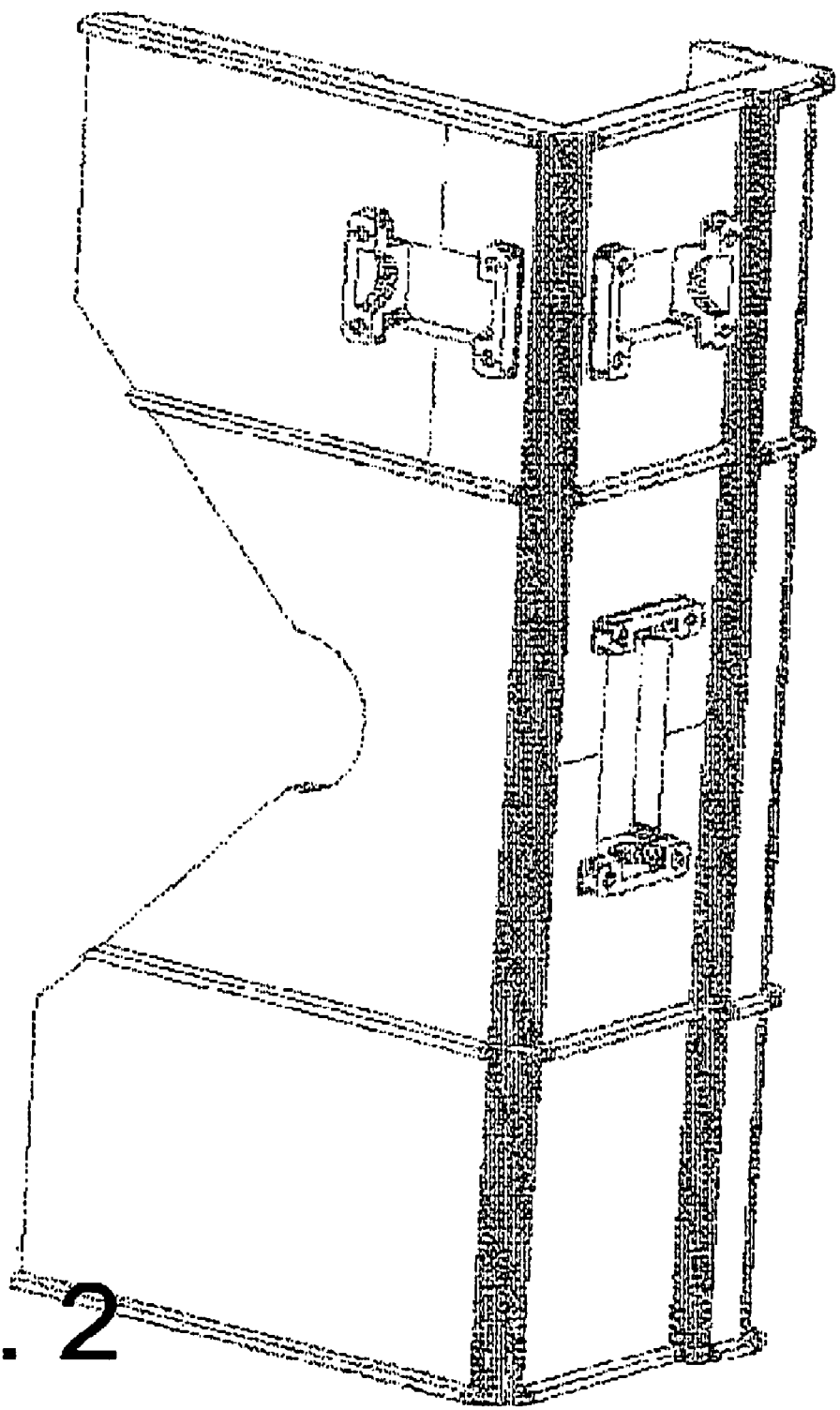
FIG. 2 is a perspective view of the body member for the EZ-level of FIG. 1 rotated 90 degrees.

With regard to FIG. 1, FIG. 1A, FIG. 1B, and FIG. 1C there is shown a first embodiment 100 of the present combination plumb and level tool (The EZ-level) invention. The EZ-level 100 is intended for general construction use, and configured to be useful for both professionals and ordinary homeowners when setting a construction member level or plumb. FIG. 1 shows a perspective view of the EZ-level 100 oriented in aligned attachment on a common structural member (work piece), e.g., a wooden 2×4 102. FIG. 1A is a cross section view taken along line A—A of FIG. 1C. FIG. 1B is an end elevation view the tool 100 in FIG. 1 with the work piece 102 in longitudinal alignment prior to insertion into the tool 100. FIG. 1C is a side elevation view showing the work piece 102 and tool 100 of FIG. 1 in aligned attachment.

The combination plumb and level tool 100 has an elongate body with two separated arm members that have spaced apart, parallel, longitudinal ends fixed to the body and extend therefrom to respective separate free ends. The arm members form opposite facing interior surfaces between their respective fixed and free ends. The two arms and the body between them have a generally U-shaped cross section that forms an open trough from the free ends to a base contact surface on the body between the fixed ends. At least one of the arms has first contact surface portion disposed on its inner surface. The first contact surface portion faces an opposing second contact surface portion of the facing arm surface. An elastic member cooperating with the first arm and the body biases the first arm inward, toward a second contact surface portion on a portion of the other of the arms. An initial spacing between the two contact surface portions is made less than the width of a work piece that is to be leveled or plumbed. The two arm contact surfaces and the base contact surface are disposed so that a rectangular object having an edge face between opposite parallel sides and a width between the parallel sides greater than the initial spacing can be received within the open trough with its edge face in contact with the base contact surface and the opposite sides in contact with the opposed facing contact surfaces of the two projecting arms. The tool is applied to an elongate work having opposite sides connected by an edge face, by aligning the trough and work longitudinally with the free end of the biased arm in contact with one side of the work and the free end of the other arm in contact with the edge face. The level is pressed toward the work, simultaneously forcing the work into the trough by using the work as a wedge that forces the two arms to spread apart until the opposing interior arm surfaces proximally engage opposite sides of the work. The level and the work are then moved together until the adjacent side of the work in the trough contacts the base contact surface of the body along its length. this leaves the body and the work aligned in two orthogonal axes defined by the arm's contact surfaces and the body's interior contact surface.

The EZ-level has a elongate body 104 defining a generally U-shaped cross section 106 (FIG. 1A) extending over a longitudinal dimension 107 between spaced apart top end 108 and opposite bottom end 110.

The U-shaped cross section 106 includes three co-extending longitudinal members 112, 114, and 120. The first longitudinal supporting member 112 forms one leg of cross section 106, extending from on side of the second rigid longitudinal member 114 that forms the base of the U-shaped body 104. the third longitudinal member 120 extends from the other side of the base member 114 and forms the other leg of the U-shaped cross section. The third member 120 is spaced away from and disposed in generally parallel facing opposition to the first supporting member 112. The proximal end of first member 112 and base member 114 are fixed together forming an inner longitudinal edge 115. Arm 112 extends away from edge 115 at base member 114 to its free end 113, forming an interior surface 122 therebetween. the surface 122 defines a contact surface portion 126 and a reference plane 127. The third longitudinal member 120 is fixed to the base member 114 by its proximal end forming a second inner longitudinal edge 117 parallel to edge 115 and spaced therefrom by lateral spacing 118. member 120 extends away from the base member 114 to its distal free end 132, forming a contoured, third inner surface 130 therebetween, facing generally parallel and opposite to the first surface 122.

Base member 114 forms an interior base surface 124 that extends from edge 115 at the base of member 112 to the second longitudinal edge 117. an intermediate base contact surface portion 119 is defined on the interior base surface 124. the two intersecting surfaces 122 and 124 define mutually perpendicular reference planes 127, 128.

the reference surfaces 122, 124 and 130 form an open ended trough inside the U-shaped cross section which is adapted to abuttingly receive and support one right-angle corner of the work 102 along the reference planes 126, 128, with one of the opposite faces 133 of the work 103 in abutting contact with the first contact surface portion 126, and the adjacent edge face 135 of the work in abutting contact with the base contact surface portion 119, along the length body length 107.

The contoured third inner surface 130 defines another inward facing longitudinal contact surface portion 131 and a third reference plane 134. The reference plane 134 passes tangential to the contact surface portion 131 and is disposed substantially parallel to the first surface 122 and reference plane 126 and perpendicular to the base contact reference plane 128. The biasing arm 120 is shaped with a S-curved, uniform longitudinal contour into three roughly length equal sections 140, 143, 145 starting from its proximal end at the base 114. The arm 120 extends outward from the base surface 124 with its inner surface 130 oriented at a first obtuse angle 136 from the base reference plane 128 at a base thickness 138. The arm thickness tapers down to 140 up to about ⅓ its extent from the base. It curves inward between the first section 140 and the second section 143 with an internal radius of 142 to the second planar section 143 at the same thickness. The arm 120 contour then curves outward between the second section 143 and the third section 145 with an opposite internal radius of 144 to the final planar section 145 of the same thickness extending to its rounded free end 132. The length of Each of the three sections 140, 143, 145 of the total extent 146 is approximately equal.

The longitudinal proximal edges 115 and 117 of the opposing arms 112 and 120 where they are fixed to the base 114 are separated by spacing 118 which is greater than the width 150 between the opposite parallel faces of the work. This is necessary to allow the end faces of work pieces with width variations up to the difference between dimension 150 and dimension 118 to reliably make butting contact with the base contact surface 119 portion when engaged with the tool 100.

The radii of curvature 142, 144 and length of the sections 140, 143 and 145 are selected so that the spacing 147 between the first contact surface portion 126 and the biased location of the undeflected third contact surface portion 131' (dashed lines) is less than the width of the work piece 150.

The radii of curvature 142, 144, length of the sections 140m 143 and 145, the thickness of the sections 138, 140, 143, and 145 and the strength modulus and elasticity modulus of the three members 112, 114 and 120 are selected so that the first longitudinal contact surface portion 126 and the third longitudinal contact surface portion 131 exerts a clamping force on the opposite parallel sides of the work placed between them when the edge face of the work is in contact with the longitudinal base contact surface portion 119, sufficient to hold the tool 100 in self-supporting attachment with the opposing contact surface portions 126, 131 and the base contact surface portion 119 both aligned longitudinally with the longitudinal axis of such an elongate work.

This guarantees that level indicators (e.g., bubble vials 160, 162, 164) aligned parallel to and/or orthogonal to the contact surface portions 126, 131 and 119 will indicate the appropriate level or plumb condition of the work when the work is positioned in the corresponding level or plumb orientation.

The embodiment 100 of the present invention has an additional feature that reduces energy expended in effort work situations where repeated attachments and alignments must be rapidly made over a sustained time period. The inner surface 130 of the longitudinal outer section 145 of the biasing arm 120 is oriented at an acute angle 170 with the reference plane 126 of the first member 112. This increases the opening of the U-shaped trough between the free ends 113 and 132', and reduces the care and precision required to orient the tool to the elongate edge face 135 of the work piece 102 when beginning the alignment and insertion of the work into the open end of the trough formed by the U-shaped cross-section 106. Referring again to FIG. 1B and FIG. 1C there is shown details of the biasing arm 120 and its attachment to the body 114. A lateral section of the body 114 extends beyond intersecting edge 117 to form an inward facing intermediate recessed longitudinal channel terminating at a nearly orthogonal, rigid end wall section 116. The end wall section 116 acts as a supporting buttress at the proximal outer surface of arm 120. The longitudinal channel is dimensioned to receive the proximal end of arm 120 fixed within it. The channel has a longitudinal length essentially coextensive with the arm 120 and lateral width essentially equal to that of the bias arm base thickness 138 to a depth 139. The biasing arm member 120 is formed first as a separate contoured plate having a longitudinal length co-extending with support arm 112 and body 114. The arm 120 is joined with the base 114 where it forms the inner longitudinal edge 117. The arm 120 extends away from its proximal connection with the base at inner edge 117 to its distal free end 132 at an orthogonal height 146.

The inner surface 130 of proximal end of arm 120 slopes outward from the base surface at an angle 136. The proximal end of the arm 120 is slightly tapered so that the opposite, outer surface of arm 120 in proximate contact with wall section 116 slopes away from the inner base surface at a slightly smaller angle 137. The proximal end of arm 120 is supported at a lateral section of its outer surface by rigid buttress wall portion 116 of the base 114 The proximal end of the outer wall of arm 120 rests in facing contact with the inner surface of wall section 116, and projects upward and outward from the body with the wall face diverging away from the base surface 124 at a angle 1136. The channel width length and depth are configured to tightly receive the proximal butt end of cantilever arm 120 therein whereat it is secured in place by fixed bonding means such as an adhesive. The butt end of arm 120 and the body are preferably joined with a press fit into the channel and permanently secured by an adhesive or glue. They could also be joined by other conventional joining methods such as soldering, welding and the like.

Regarding FIG. 1C, the Biasing arm 120 has a lateral height 146 from the base surface at its proximal end to its distal free end 132. Its height 146 is preferably less than the height 152 of the work piece between opposite end faces for alignment of the work when the opposite edge face of the work abuts against another, coplanar work surface (not shown). The arm 120 has a contoured uniform longitudinal cross section composed of 5 section segments, 180, 182, 184, 186 and 188. The segments 180, 182, 184, 186 and 188 are smoothly joined end-to-end between the arms proximal fixed end and the distal free end 132. Section 182 is a smooth, inward facing, concave circular segment with inner radius 142 joining the distal end of tapered section 180 with a proximal end of planar section 184. Section 186 is a smooth, inward facing convex circular segment having an inner radius 144 joining the opposite end of segment 184 with an proximal end of planar section 188. Section 188 terminates at its opposite distal end with the rounded free end 132.

Figure 3:
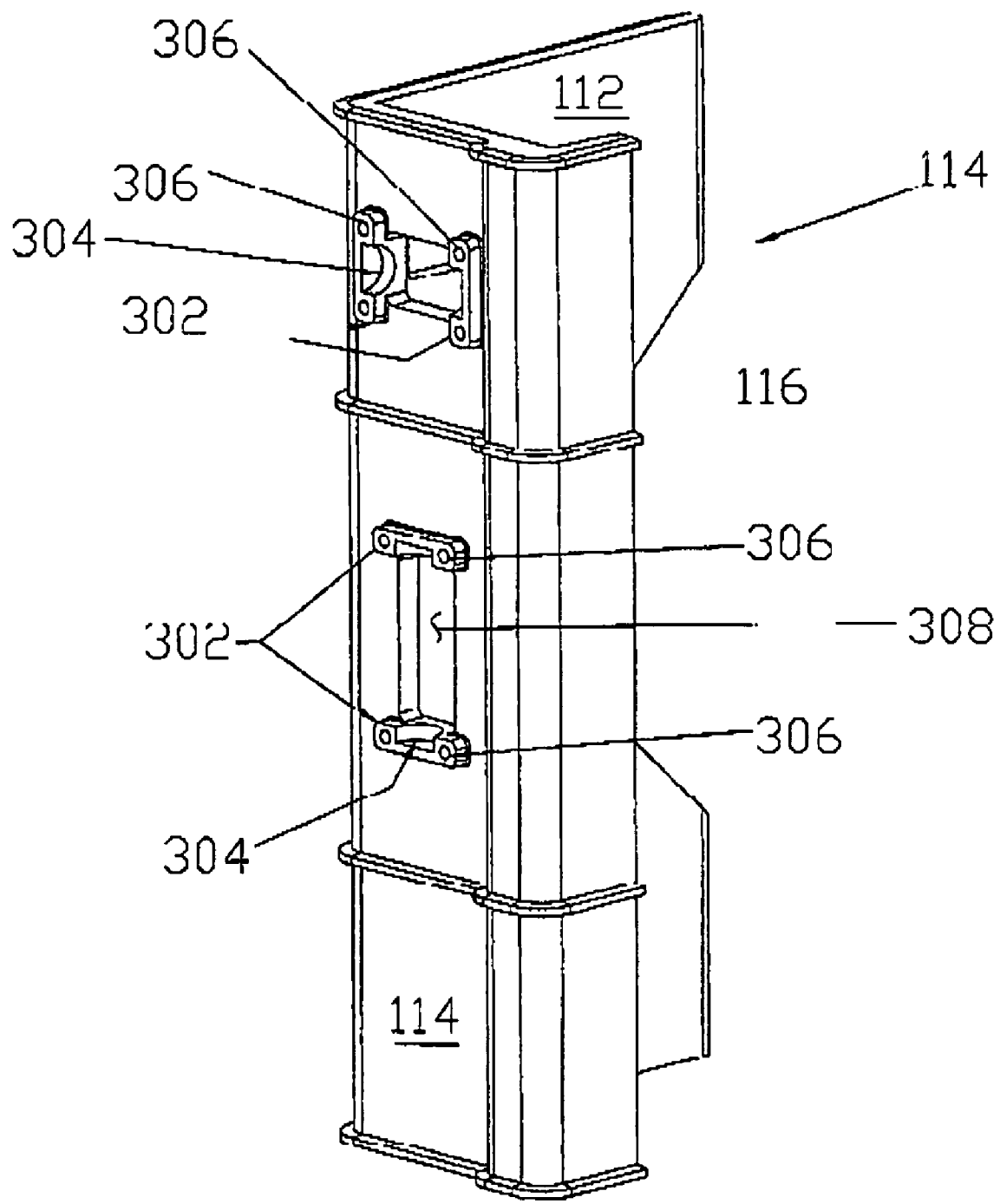
FIG. 3 is a perspective view of the EZ-level of FIG. 1 showing the body and reference plate separated from the resilient cantilever arm.
Figure 7:
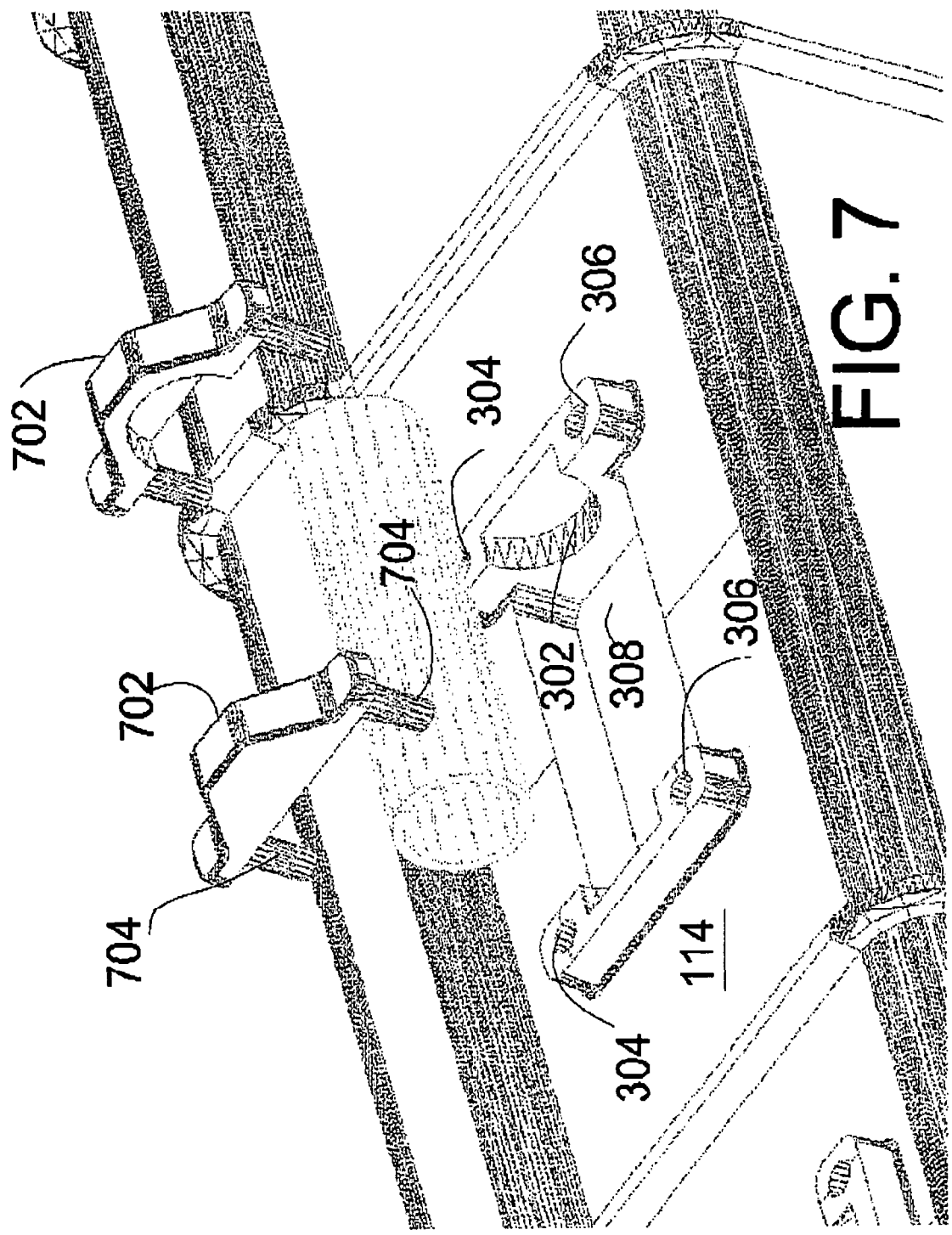
FIG. 7 depicts a detail view of the bubble level vial mounting on the level of FIG. 1.

Referring to FIG. 7 and FIG. 3 is a perspective view of the separate body member 114 of FIG. 1 showing the integral first reference arm 112, orthogonal Bubble vial mounts 302, vial end shoulder recesses 304 for receiving bubble vial ends, and bore holes 306 for receiving locating pins from bubble vial end caps and illumination apertures 308 disposed in the base member under the bubble vials.

Figure 4:
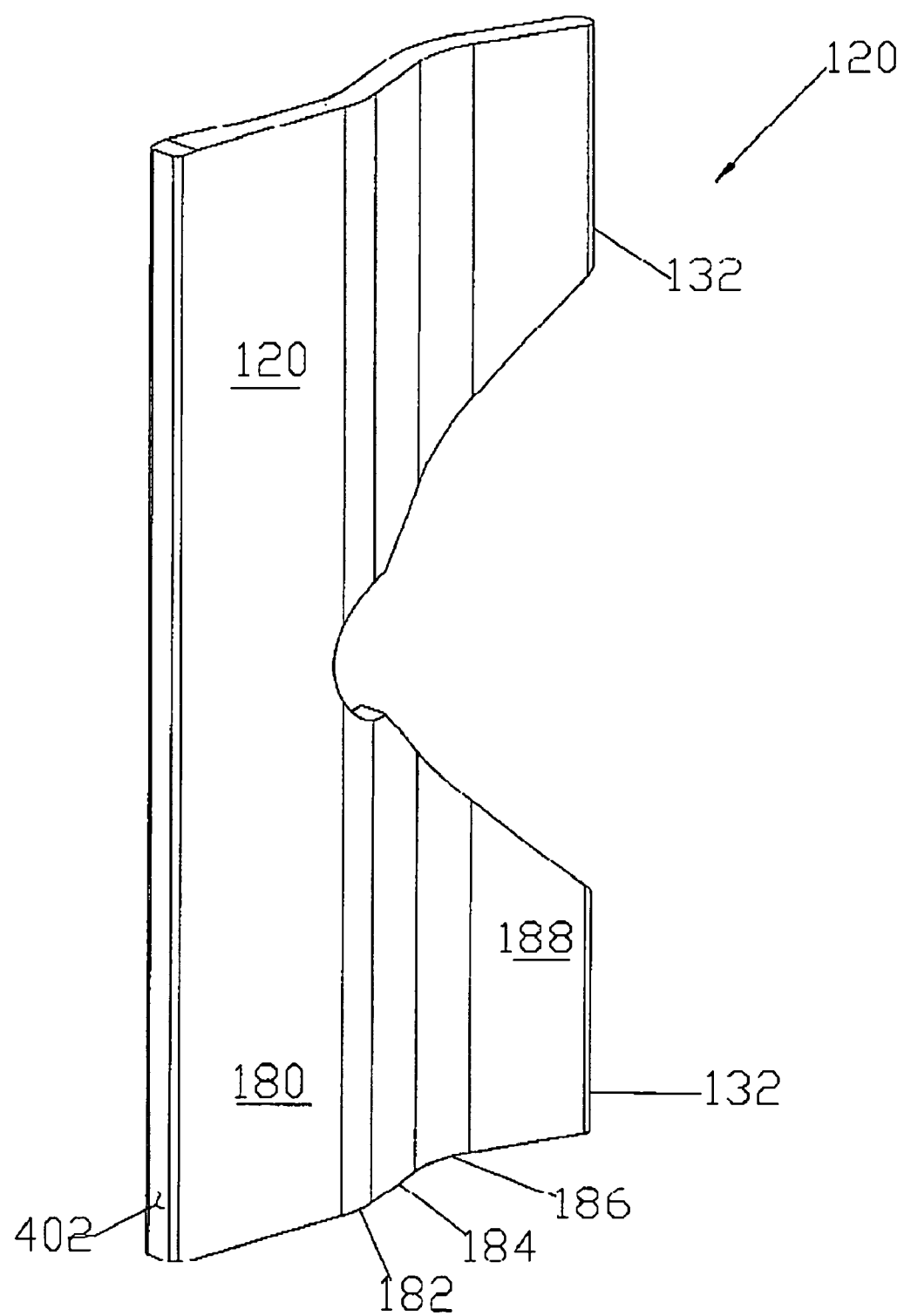
FIG. 4 is a perspective view of the cantilever arm for the level of FIG. 1

FIG. 4 depicts the cantilever arm 120 showing the proximal butt end 402 prior to being fixed in the channel recess 141 defined in the base 114 shown in FIG. 1A and FIG. 1B.

Figure 5:
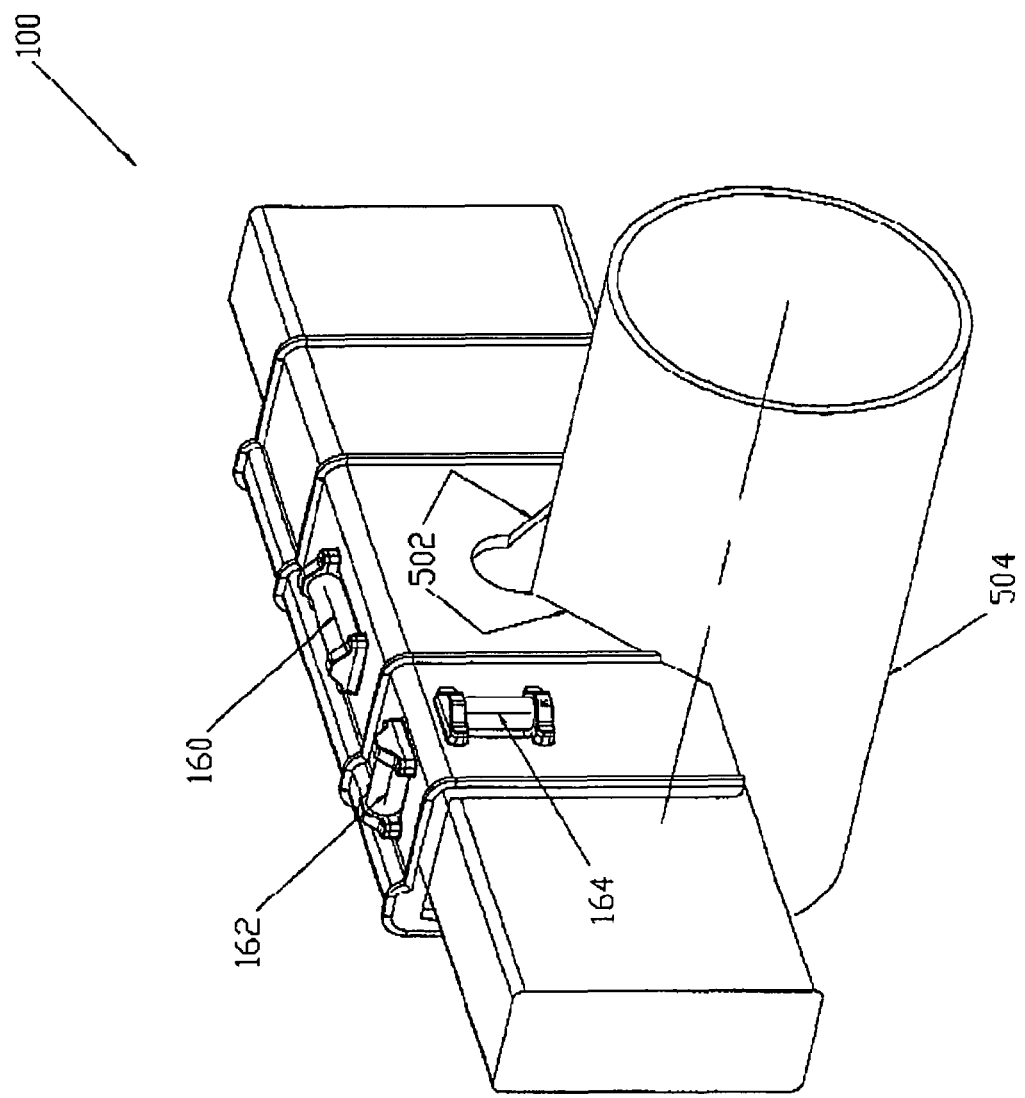
FIG. 5 Shows a perspective view of the EZ-level of FIG. 1 being used on a Pipe or cylindrical object.

Referring to FIG. 5, the arms 112 and 120 are notched at their free ends 132 to form right angle faces 502. Faces 502 are aligned with one of the orthogonal bubble vials 162 so that pipe 504 can be leveled by observing the bubble vial 162 with the notch faces 502 in contact with the outer cylindrical surface of pipe 504.

Figure 6:
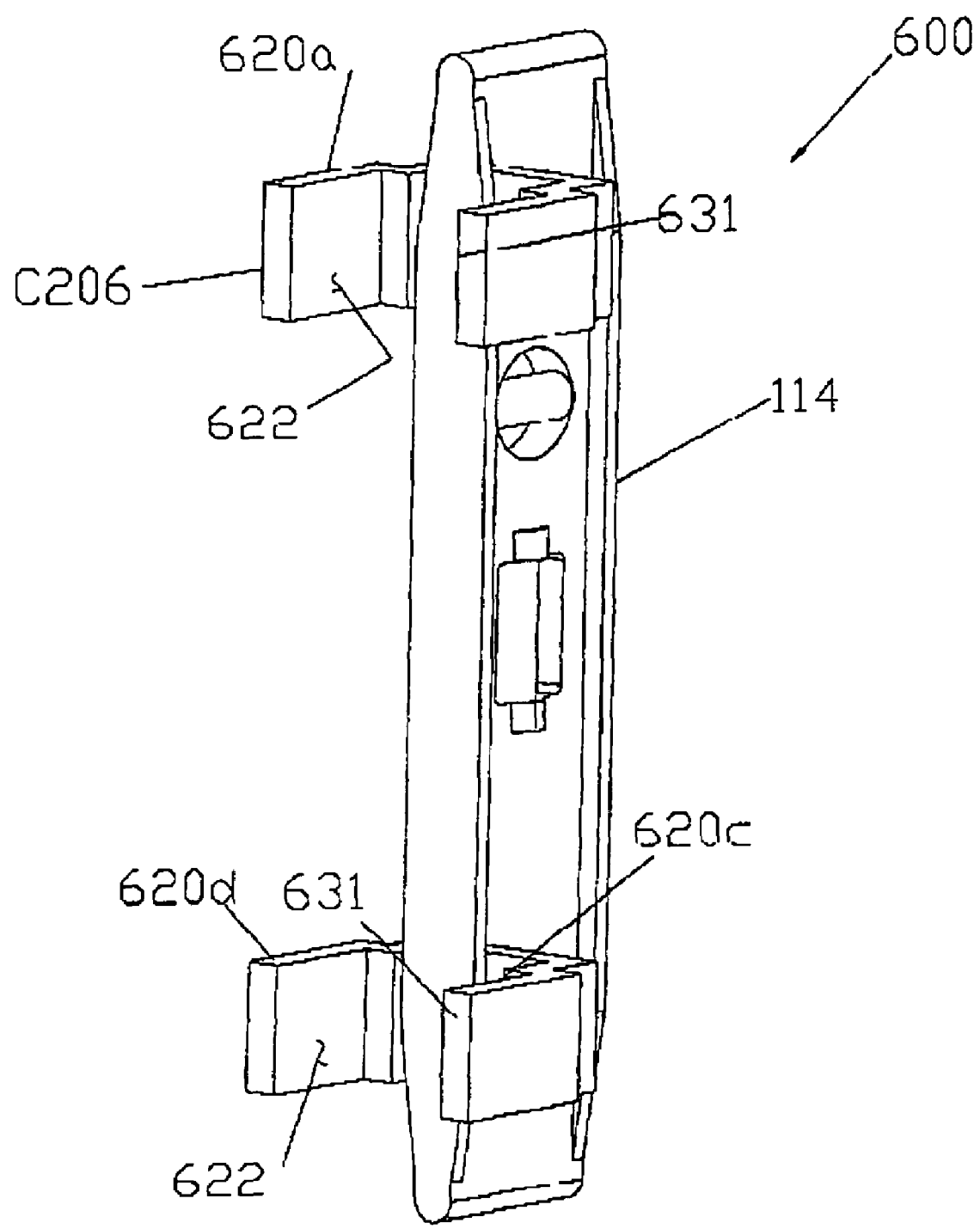
FIG. 6 illustrates a perspective view of an alternate embodiment of the present EZ-Level invention.

FIG. 6 illustrates an alternate embodiment 600 of the present invention with a body 614 supporting proximal ends of 4 spaced apart resilient arm members 620a, 620b, 620c and 620d. The proximal ends of arms 620a and 620c are disposed on one side of body 614 at opposite ends, and the arms 620b, 620d on the opposite side, adjacent to the other end. The arms 620a, 620b extend outward from the one end of body 614 to form distal ends with parallel, facing contact surfaces 622, 631 aligned in mirror opposition.

The arms 620c, 620d extend outward from body 614 to form distal ends with another pair of parallel, facing contact surfaces 622, 631 aligned in mirror opposition.

The contact surfaces are spaced apart less than the width of the work to be received.

FIG. 7 in combination with FIG. 3 shows details of bubble vial bubble vial end mounting shoulder recess 302, end caps 702, mounting pins 704 and pin receiving bores 304, 306, with illumination apertures 308 formed in the base member 114 under the bubble vials.

Figure 8:
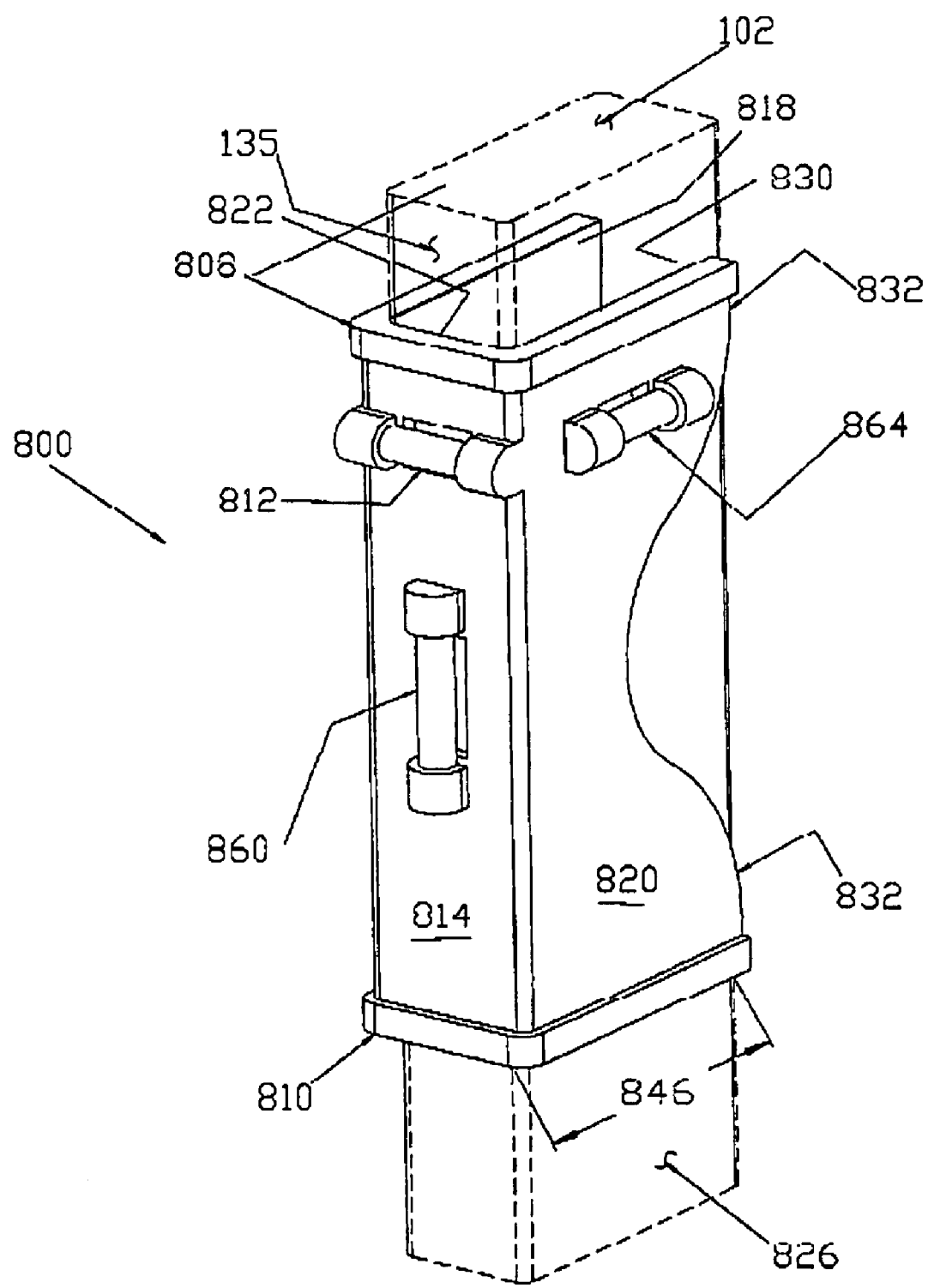
FIG. 8 and FIG. 9 Depicts two additional alternative embodiments of the present invention.

FIG. 8: is another embodiment 800 of the present tool invention. The tool 800 is essentially identical with the tool of FIG. 1, with the exception that the resilient arm 120 of FIG. 1 is replaced by a laterally resilient but longitudinally stiff arm 820 formed integral with the body 114 and reference arm 112. Identical reference characters in FIG. 8 and FIG. 1 indicate the same functions The EZ-level of FIG. 8 has the same two reference surfaces of the channel are defined as very flat plane surfaces perpendicular to one another. These two surfaces are intended as references surfaces to define the reference planes. The first (primary) flat surface 820 is designed to register one side 826 of the construction member (2×4), while the opposite (secondary) flat surface 824 is intended to register on an adjacent parallel surface 828 of the construction member (2×4). These two reference surfaces are configured to be parallel and perpendicular respectively to corresponding orthogonal bubble level vials 860, 862 disposed on the outer body 814 of the level 800.

The first 820 and second 822 reference surfaces are intended as the reference planes for measuring the plumb or level of an object (the work piece) to which they are attached with respect to earth.

The first leg extends perpendicular from the base leg to its distal edge 832 at dimension 846. The base separates the first 812 leg and parallel third leg 820 by dimension 818. The third leg 820 extends perpendicular from base 814 to its distal edge at dimension 846.

Figure 9:
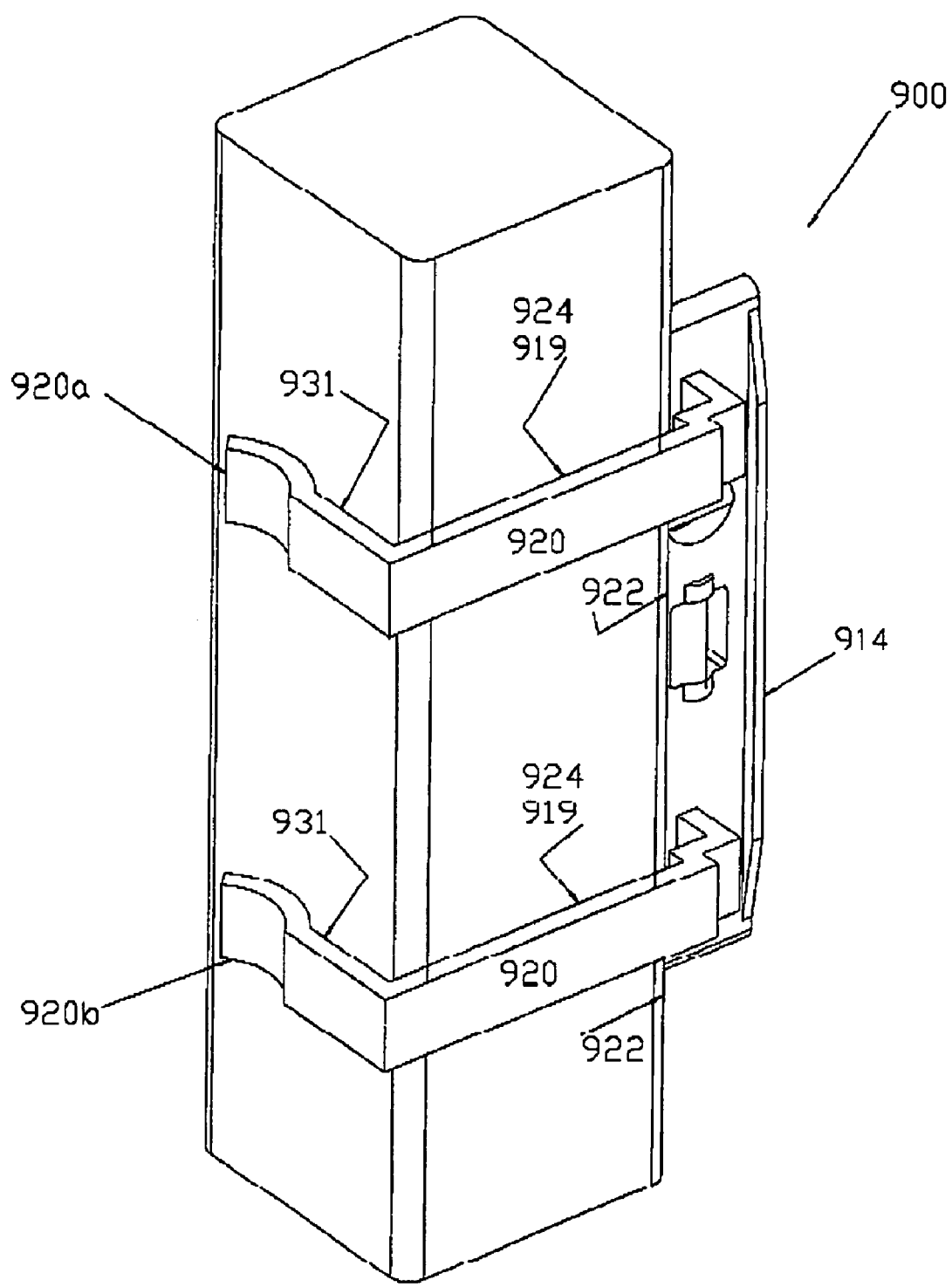

FIG. 9 is another embodiment of the present invention with a longitudinal base 914 supporting proximal ends of spaced apart laterally resilient arms 920. Base 914 has a flat surface forming parallel interior surfaces 922. Distal ends 920a, 920b of arms 920 form the opposing parallel interior surfaces 931 facing base surfaces 922

One of the key features of the EZ-level invention is integral one-hand operable attachment and release mechanism. This mechanism allows the level to be temporarily attached to the work piece with an independent retention feature that serves to clamp the level to the work piece. For the level 800, the retention mechanism is the clamping action of the two resilient arms 812, 820 exerting frictional pressure on the opposed faces 826,828 of the 2×4 member. The dimensions of this tool can easily be varied by for alternative embodiments of the invention to accommodate various standard lumber sizes. For example, alternatives of the body of this design would have a base width that could be designed specifically for different sized lumber; 2×4, 4×4 etc. it is expected that the majority of the market will consist of 2×4 and 4×4 construction, however the base width can be designed to accommodate just about any structural member size and shape.

In this embodiment, the body and the arm portions are preferably composed of a longitudinal extrusion of either aluminum or rigid plastic or a molded aluminum or rigid plastic. A preferred plastic material is glass filled Nylon, acrylonitrile butadiene styrene resin (ABS plastic) or Lexan.R™. However this tool can be constructed from a large number of suitably strong, rigid, yet elastic, dimensionally stable materials having sufficient resilience and strength to support the level's weight by the clamping action of the two opposed arms.

The embodiments of the invention are preferably made by an injection molding process using thermoplastics from the generic families: ABS, Polypropylene, Polyethylene, PVC, Polyurethane, High Impact Polystyrene and Polystyrene, and Polycarbonate.

Other types of wood and metal commonly used for hand-held tools.

The preloaded arm or clamp member, can be an integral part of the main body of the level, or member that is rigidly fixed at one longitudinal edge to the main body. The one longitudinal edge end can be bonded, screwed, rotationally hinged or spring-loaded, press fit into a receiving slot or aperture.

I claim:

1. For a work piece having a uniform longitudinal cross-section having a width defined by spaced apart parallel opposite sides with an adjacent intersecting edge face disposed between, a tool for single-hand attachment and alignment to such work piece, said tool comprising:
an elongate body with first and second separated arm members that have spaced apart, parallel, co-extending longitudinal ends fixed to the body,
in which said arms extend distal therefrom to respective separate free ends;
first and second inward facing interior surfaces disposed generally in facing opposition on said two arm members between said respective fixed and free ends;
generally co-extending respective first and second longitudinal contact surface portions respectively disposed on said first and second inward facing interior surfaces with;
said first longitudinal contact surface portion defining a first reference plane generally extending parallel to said longitudinal body;
a longitudinal interior base surface disposed on said body between said proximal fixed ends of said two arms that forms the base of a generally U-shaped open end trough with said first and second inward facing interior;
a longitudinal base contact surface portion disposed on said interior base surface, generally co-extending with said respective first and second longitudinal contact surface portions, said first and second longitudinal contact surface portions disposed between said proximal fixed ends and said distal free ends;
said base contact surface portions defining a second reference plane orthogonal to said first reference plane and generally parallel to said longitudinal body;
an elastic member cooperating with said second arm and said body disposed to bias said second contact surface portions of said second arm inward, toward said first contact surface portions of said first arm such that;
said first and second contact surface portions have an initial, biased spacing therebetween less than said width of said work piece such that;
with said workpiece positioned with said adjacent intersecting edge face in abutting proximal contact with said longitudinal base contact surface portion, and in which one side of said workpiece spaced apart parallel opposite sides is in abutting proximal contact with said first contact surface portion and in which said second contact surface portion is displaced outwardly from said initial, biased spacing and is in proximal abutting contact with the opposite one of said workpiece spaced apart parallel opposite sides, and in which;
said elastic members is adapted to cooperate with said body and said second arm to hold said body attached to said workpiece with said first reference plane parallel to said workpiece opposite sides and said second reference plane parallel to said workpiece edge.

2. The tool as set forth in claim 1, wherein:
said two arm contact surface portions and said base contact surface portion are disposed so that said work piece having said edge face of said width between said opposite parallel sides greater than said initial spacing can be received within said open trough with its edge face in contact with said base contact surface portion and said opposite sides in opposing contact with said respective opposed facing contact surface portions of said two projecting arms with said second arm in an outward displaced position from said initial spacing.

3. The tool as set forth in claim 1, comprising:
a level indicator aligned with an axis selected from the group consisting of an axis
parallel to one of said longitudinal reference planes and an axis orthogonal to one of said longitudinal reference planes.

4. The tool as set forth in claim 1, in which said biasing of said elastic member comprises:
said first arm being provided with suitable pre-selected length, width, thickness, cross-section contour and resilient material properties;
a spring-biased hinge comprising:
a longitudinal hinge fixing said fixed end of said first arm to said body, said hinge having a longitudinal axis between said arm end and said body;
a spring connected between said body and said first arm biasing said arm to rotate said arm inward about said hinge.

5. The tool as set forth in claim 1, in which said biasing of said elastic member comprises:
said first arm having a selected longitudinal length, a selected projecting extent from said fixed to said free end, a selected thickness, a selected cross-section contour and selected material strength, and elasticity to resiliently provide said biasing of said first contact surface portion to said initial spacing from said second contact surface portion.

6. A releasable attachment mechanism for attaching a body to a longitudinal work piece in which said work piece has a uniform cross section defined by parallel sides spaced apart by a width at an edge face between said parallel sides, said attachment mechanism comprising:
a) An elongate body with separated first and second, generally parallel, longitudinal arm members fixed at respective spaced apart proximal ends located adjacent to respective opposite sides of said body;
b) In which said longitudinal arm members extend distal from their respective proximal ends to corresponding spaced apart free ends, said arm members defining respective opposite facing, longitudinal interior surfaces between their respective fixed and free ends.
c) Said first and said second arms and said body disposed to define a generally U-shaped cross section forming an open longitudinal trough extending between said distal free ends along a planar, proximal, longitudinal base contact surface portion located on said body and in which said planar base contact portion defines a second reference plane;
d) A first reference plane defined by a planar interior contact surface portion disposed on said first arm member facing an opposing second interior contact surface portion disposed on said opposing second arm member;
e) Wherein said first arm and said body are rigidly connected so that said first reference plane and said second reference plane are orthogonal and intersect parallel to a longitudinal first reference axis;
f) A biasing elastic member cooperating with said second arm and said body such that said second arm is biased inward, so that said two opposing interior contact surface portions are spaced apart by an initial spacing, in which said initial spacing is less than said edge width of said work piece to which said attachment is to be made, and further,
g) in which said two arm contact surfaces and said base contact surface are disposed so that said work piece can be received within said open trough with said edge face in contact with said base contact surface and said opposite sides in contact with respective ones of said opposed facing contact surfaces of said two projecting arms with said biasing member pressing said first and second arm members against said opposite sides with sufficient force to hold said body attached to said work piece with said first reference plane aligned parallel to said opposite work piece sides, and said second reference plane is aligned parallel to said work piece edge face.

7. A process for attaching the tool of claim 6 to an elongate work having opposite sides connected by an edge face, said process comprising:
 a) a step of aligning the trough and work longitudinally with the free end of the biased arm in contact with one side of the work and the free end of the other arm in contact with the edge face;
 b) a step of pressing the level toward the work, simultaneously forcing the work into the trough by using the work as a wedge that forces the two arms to spread apart until the opposing interior arm surfaces proximally engage opposite sides of the work;
 c) a step of continuing to move the level and the work together until the adjacent edge face of the work in the trough contacts the base contact surface of the body along a longitudinal extent,
 d) whereby the body and the work are aligned in two orthogonal axes defined by the opposed arm's contact surfaces and the body's interior contact surface.

8. A leveling device incorporating the attatchment mechanism as set forth in claim 6, further comprising:
 a first level indicator mounted parallel to a first one of said reference planes and perpendicular to a second one of said reference planes so that said indicator indicates a level condition when said first reference plane is horizontal and indicates a plumb condition when said second reference plane is plumb.

9. A leveling device incorporating the attatchment mechanism as set forth in claim 8, further comprising:
 a second level indicator mounted orthogonal to said first level indicator and a third level indicator mounted orthogonal to both so that said second indicator indicates a plumb condition and said third indicator indicates a level condition when said indicator is plumb.

10. A leveling device incorporating the attatchment mechanism as set forth in claim 6, in which said respective portions of said first and second arm members are formed to flare outward from respective first and second contract surface portions to corresponding distal free ends spaced apart by a biased opening width which is greater than said width or said work piece,
 whereby ad work piece is freely received between said flared portions when longitudinally aligned with said body.

* * * * *